United States Patent [19]

Rivera

[11] Patent Number: 4,934,506

[45] Date of Patent: Jun. 19, 1990

[54] ESCALATOR HANDRAIL GUIDE RAIL

[75] Inventor: James A. Rivera, Bristol, Conn.

[73] Assignee: Otis Elevator Company, Farmington, Conn.

[21] Appl. No.: 407,504

[22] Filed: Sep. 14, 1989

[51] Int. Cl.[5] .............................................. B65G 15/00
[52] U.S. Cl. .................................................... 198/335
[58] Field of Search ........................ 198/335, 337, 841

[56] References Cited

U.S. PATENT DOCUMENTS 3,321,059 5/1967 Kroepel .............................. 198/335
3,623,589 11/1971 Johnson .............................. 198/335
3,719,265 3/1973 Redding et al. .................... 198/335
4,836,353 6/1989 Adrian et al. ....................... 198/335

FOREIGN PATENT DOCUMENTS 3602945 8/1987 Fed. Rep. of Germany ...... 198/337

*Primary Examiner*—David A. Bucci
*Assistant Examiner*—Cheryl L. Gastineau
*Attorney, Agent, or Firm*—William W. Jones

[57] ABSTRACT

The guide rail for an escalator handrail is provided with a plurality of laterally extending pins which provide the sole contact with the handrail. The pins reduce frictional drag of the handrail by providing line and point contact only between the handrail and the guide rail.

3 Claims, 1 Drawing Sheet

ESCALATOR HANDRAIL GUIDE RAIL

TECHNICAL FIELD

This invention relates to a guide rail for an escalator handrail which reduces frictional drag on the handrail.

BACKGROUND ART

Modern escalators are provided with moving handrails which are usually made from rubber or some similar tough, flexible material. The handrails are mounted on guide rails which are fixed to the top of the escalator balustrade. The handrail drive can be some form of mangle drive, or it can include a sprocket for engagement with a toothed or apertured belt or tape mounted on the handrail. In any case, the handrail is in effect dragged along the fixed guide rail by some sort of handrail drive. It is apparent that friction between the handrail and the guide rail will present problems in the system. Friction thus generated will increase handrail drag which can cause wear and tear on the handrail and on the handrail drive. When extreme, slippage of the handrail in the handrail drive can occur. Friction can also generate heat in the handrail to the extent that the handrail may become uncomfortable to the touch.

The aforesaid problems have been recognized and various solutions have been offered. The inner or underside of the handrail may be provided with a covering of low friction laminated fabric such as nylon or cotton fabric, or the like. The guide rail may be profiled so as to minimize surface contact area between the handrail and the guide rail. The result is longitudinally extending transversely limited tracks on the guide rail which touch the handrail. A guide rail of this type is shown in U.S. Pat. No. 4,836,353, granted June 6, 1989. Low friction plastic components may be fitted onto the guide rail as disclosed in pending U.S. Ser. No. 386,314, filed July 28, 1989. Rotating rollers may be mounted on the guide rail, as disclosed in U.S. Pat. No. 3,623,589 granted Nov. 30, 1971.

DISCLOSURE OF THE INVENTION

This invention relates to a guide rail construction for an escalator handrail which reduces friction induced by sliding of the handrail over the guide rail. The guide rail includes a base part which is secured to the top edge of the balustrade on the escalator. The balustrade is a relatively planar member made from glass, metal or the like. There are a plurality of cylindrical pins mounted in the upper surface of the guide rail base. The pins are elongated in the transverse direction of the guide rail and project above the top surface of the guide rail base. The sides of the pins thus form the guide surface over which the handrail slides. Since the pins are cylindrical, the handrail guide surface is in fact a series of lateral line contacts. The area of actual face-to-face friction-engendering contact between the guide rail and the handrail is thus drastically reduced as compared to a conventional escalator handrail guide rail. Transversely positioning the contact pins on the guide rail base provides good lateral support for the handrail.

It is therefore an object of this invention to provide an improved escalator handrail guide rail having decreased friction between the handrail and guide rail.

It is a further object of this invention to provide a guide rail of the character described wherein there is a minimum of surface area contact between the handrail and guide rail.

It is another object of this invention to provide a guide rail of the character described wherein full lateral support of the handrail by the guide rail is afforded.

These and other objects and advantages of the invention will become more readily apparent from the following detailed description of a preferred embodiment thereof when taken in conjunction with the accompanying drawings, in which:

BEST MODE FOR CARRYING OUT THE INVENTION

Figure 2:
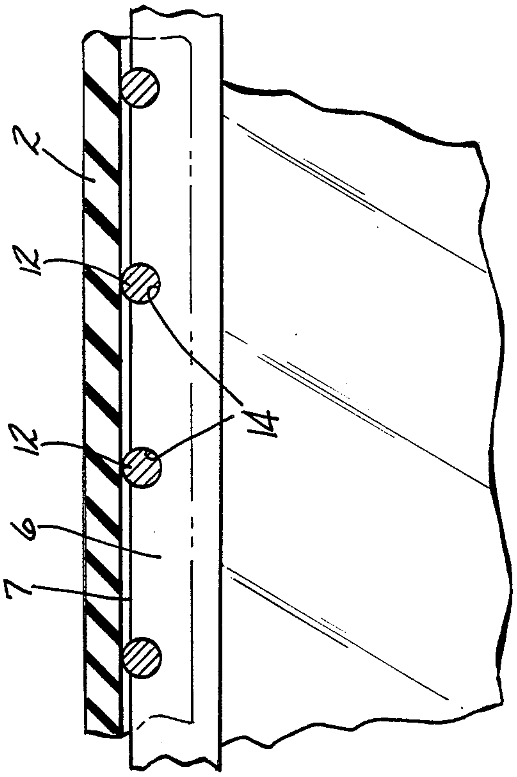
FIG. 2 is a view of the assembly of FIG. 1 taken along line 2—2 thereof.
Figure 1:
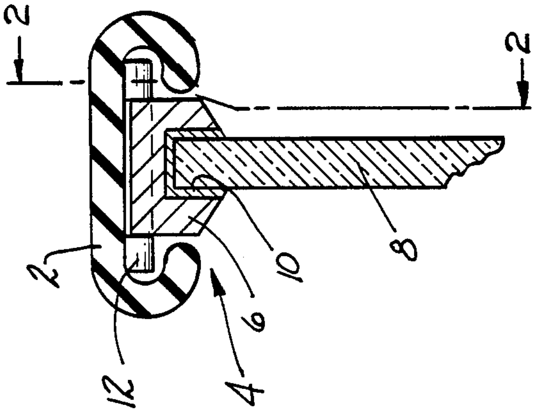
FIG. 1 is a cross-sectional view of an escalator balustrade, handrail and guide rail assembly embodying this invention.

Referring to FIGS. 1 and 2, the handrail 2 is mounted on a guide rail assembly 4 which includes a base 6 mounted on the top margin of the escalator balustrade 8. A paper gasket 10 is sandwiched between the base 6 and the balustrade 8. A plurality of handrail support pins 12 are mounted in the base 6 and extend laterally of the handrail 2. The pins 12 are set in transverse recesses 14 in the base 6. The sides of the pins 12 project above the top surface 7 of the base 6 so that only line contact is made between the pins 12 and the handrail 2, as best shown in FIG. 2. The pins 12 are fixed in the base 6 so as not to rotate or otherwise move therein.

Figure 3:
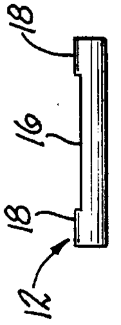
FIG. 3 is a side view of one of the support pins for the handrail.

Referring to FIG. 3, the preferred configuration to the support pins 12 is shown. Each pin 12 has a medial flat 16 formed thereon, with the ends 18 flanking the flat 16 being cylindrical. When set in the base 6, the pin flats 16 are all substantially parallel to the top surface 7 of the base 6. Thus only the ends 18 of each pin 12 actually touch the handrail 2. This further reduces the friction engendered as the handrail 2 moves over the guide rail assembly 4.

It will be readily appreciated that the guide rail of this invention creates less drag and less heat in the handrail due to the markedly decreased area of contact between the handrail and guide rail assembly. Adequate handrail support is provided by the guide rail despite the reduction in contact area between the two components. The guide rail is of simple construction and rugged, providing extended operational life.

Since many changes and variations of the disclosed embodiment of the invention may be made without departing from the inventive concept, it is not intended to limit the invention otherwise than as required by the appended claims.

What is claimed is:

1. A low friction guide rail assembly for use in supporting and guiding movement of an escalator handrail, said guide rail assembly comprising:
   (a) a base adapted to be mounted on an upper margin of an escalator balustrade; and
   (b) a plurality of elongated support pins fixedly mounted against rotation on said base, said support pins being spaced apart along said base with each pin extending transversely of said base, and said pins projecting above a top surface of said base to form a series of lines of contact with an escalator handrail mounted on said assembly.

2. The guide rail assembly of claim 1 where said pins project beyond sides of said base to provide increased transverse support of the handrail.

3. The guide rail assembly of claim 1 wherein said pins include cylindrical end parts and a medial flattened part between said end parts and facing the handrail, whereby said lines of contact are limited to said end parts.

* * * * *